United States Patent [19]

Endo

[11] Patent Number: 4,907,226
[45] Date of Patent: Mar. 6, 1990

[54] DISK WRITE ERROR RECOVERY SYSTEM

[75] Inventor: Akira Endo, Kanagawa, Japan

[73] Assignee: Mitsubishi Denki Kabushiki Kaisha, Japan

[21] Appl. No.: 92,336

[22] Filed: Sep. 2, 1987

[30] Foreign Application Priority Data

Sep. 5, 1986 [JP] Japan .................. 61-209292

[51] Int. Cl.⁴ ............................................. G06F 11/10
[52] U.S. Cl. ...................... 371/10.1; 360/53
[58] Field of Search ............... 371/9, 10, 38; 360/47, 360/53

[56] References Cited

U.S. PATENT DOCUMENTS

| 3,771,143 | 11/1973 | Taylor | 364/200 |
|---|---|---|---|
| 4,434,487 | 2/1984 | Rubinson et al. | 360/53 |
| 4,498,146 | 2/1985 | Martinez | 364/900 |
| 4,525,839 | 6/1985 | Nozawa et al. | 371/10 |
| 4,631,723 | 12/1986 | Rathbun et al. | 371/10 |
| 4,706,136 | 11/1987 | Wentzel et al. | 360/53 |
| 4,774,700 | 9/1988 | Satoh et al. | 360/53 |

FOREIGN PATENT DOCUMENTS

| 127732 | 12/1984 | European Pat. Off. | 371/10 |
|---|---|---|---|
| 147832 | 10/1985 | Japan | 371/10 |

Primary Examiner—A. D. Pellinen
Assistant Examiner—Geoffrey S. Evans
Attorney, Agent, or Firm—Townsend and Townsend

[57] ABSTRACT

A disk write error recovery system including an alternate sector part previously specified for rewriting of the associated data upon any write error produced, the alternate sector part being rewritten when any error is produced and having its header part marked with a used mark, for the purpose of recovery of such a write error.

6 Claims, 5 Drawing Sheets

ARRANGMENT OF SECTOR PART

DISK WRITE ERROR RECOVERY SYSTEM

BACKGROUND OF THE INVENTION

1. Field of the Invention

The present invention relates to a writer error recovery system adapted to automatically start the recovery of any write error found in a magnetic disk upon writing any data in a sector part provided on the magnetic disk.

2. Description of the Prior Art

A prior write error recovery system will be described with reference to FIGS. 6 and 9.

FIG. 6 is a schematic illustrating the prior write error recovery system.

As shown in the figure, designated at 1 is a disk device, 2 is a disk controller for controlling the disk device 1, 2a is a disk control program provided in the disk controller 2, 3 is a central processing unit (hereinafter referred to as a CPU.) for forcing the disk controller to start I/O operation. 4 is a channel for transferring I/O instructions issued from the CPU 3 to the disk controller 2, and 5 is a main memory for storing a driver program 5a serving to operate the disk device 1 and for storing a disk initialization program 5b for writing any data in an alternate track after any error is produced.

In addition, FIGS. 7 and 8 are schematical views respectively illustrating the arrangement of sector parts provided on a magnetic disk. In FIG. 7, A1 to A5 respectively illustrate sector parts, and in FIG. 8, A21 is a header part in each of the sector parts A1 to A5 shown in FIG. 7 and A22 is a data part in the sector part A3.

Hereupon, the header part A21 comprises a plurality of subsections (three in the figure).

In what follows, operation of such a prior write error recovery system will be described in accordance with a process thereof shown in FIG. 9.

Upon a write request from a user to the disk (step S12), the CPU 3 drives the disk controller 2 in conformity with the driver program 5a stored in the main memory 5 for writing in the disk (Step S13). When any write error is produced (Step 14), the CPU 3 sends back the write error to a user program to end the execution of that program, and informs the user of the write error (Step 15). An operator, as informed of the write error in the disk, assigns an alternate sector to that error sector using the disk initialization program 5b (Step S16). That is, a numeral 5 indicative of the alternate sector part A5 and an error mark E are written in the header part A21 of the sector parts A1 to A5, in which the error is produced, with use of the disk initialization program 5b, as shown in FIG. 8 for example. The alternate sector part A5 is thereafter rewritten (Step S17).

However, such a prior disk write error recovery system arranged as described above suffers from a problem that any error is once produced therein in ordinary use, the alternate sector can not be determined after the end of the error. Moreover, it suffers from another problem that any error not produced upon checking of the disk can not be processed.

SUMMARY OF THE INVENTION

In view of the drawbacks with the conventional systems, it is an object of the present invention to provide a disk write error recovery system capable of recovering any write error produced in ordinary use and of processing an error sector not produced upon checking of the disk.

To achieve the above object, a disk write error recovery system according to the present invention is adapted to permit a disk to include thereon a sector part composed of a header part and a data part, and adapted, when any write error is produced upon writing data in the data part in the sector part, to rewrite the data in a data part in an alternate sector part instead of writing that data in said data part in said sector part. The system is furthermore adapted to permit the alternate sector part for rewriting at any error to be previously specified, in which alternate sector part the associated data is rewritten upon any write error being produced and a header part of which alternate sector part is marked with a mark indicative of said alternate sector part being already used, for recovering such a write error.

The above and other objects, features, and advantages of the invention will become more apparent from the following description when taken in conjunction with the accompanying drawings.

DESCRIPTION OF THE PREFERRED EMBODIMENT

In what follows, an embodiment of a disk error recovery system according to the present invention will be described with reference to the accompanying drawings.

Figure 1:
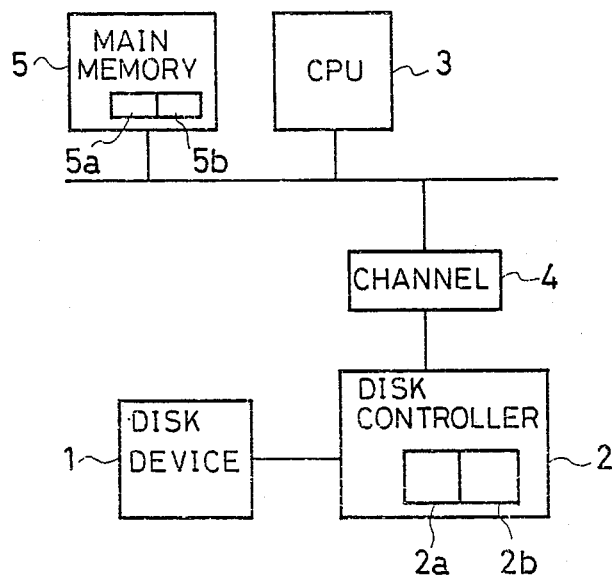
FIG. 1 is a block diagram illustrating an embodiment of the disk write error recovery system according to the present invention.

FIG. 1 is a view illustrating the arrangement of the write error recovery system of the present invention wherein designated at 1 to 5 are the same constituent elements as those of the prior one, and 2b is a write error recovery program accomodated in the disk controller 2.

Figure 2:
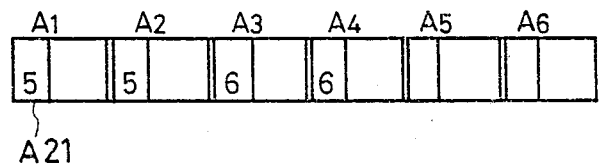
FIG. 2 is a view illustrating a initial state of a sector part of the present invention.

FIG. 2 is a view illustrating an initial state of sector parts provided on a magnetic disk wherein a header part A21 of one A1 of the sector parts A1 to A4 is marked with the number of an alternate sector part, and sector parts A5 and A6 are employed as the alternate sector parts.

Figure 3:
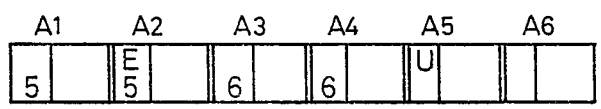
FIG. 3 is a view illustrating a state of the sector part when any write error is produced.

FIG. 3 illustrates a state of the sector parts when any write error is produced in a sector part A2. As shown in the figure, the header part A21 in the sector part A2 has an error mark E indicative of a write error being found, a number 5 of the alternate sector part A5 indicative of the alternate sector part A5 in which the associated data is rewritten, and a used mark U written in the alternate sector part A5.

Figure 4:
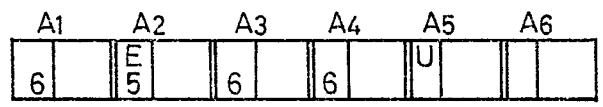
FIG. 4 is a view illustrating a state of resetting of an alternate sector part.

FIG. 4 illustrates a state of the sector parts to which an alternate sector is again assigned with the aid of a disk initialization program 5b after the used mark is written therein, wherein a number 6 of a non-assigned alternate sector part A6 is written in the header part A21 in the sector part A1 instead of the number 5 of the alternate sector part written in the same.

Figure 5:
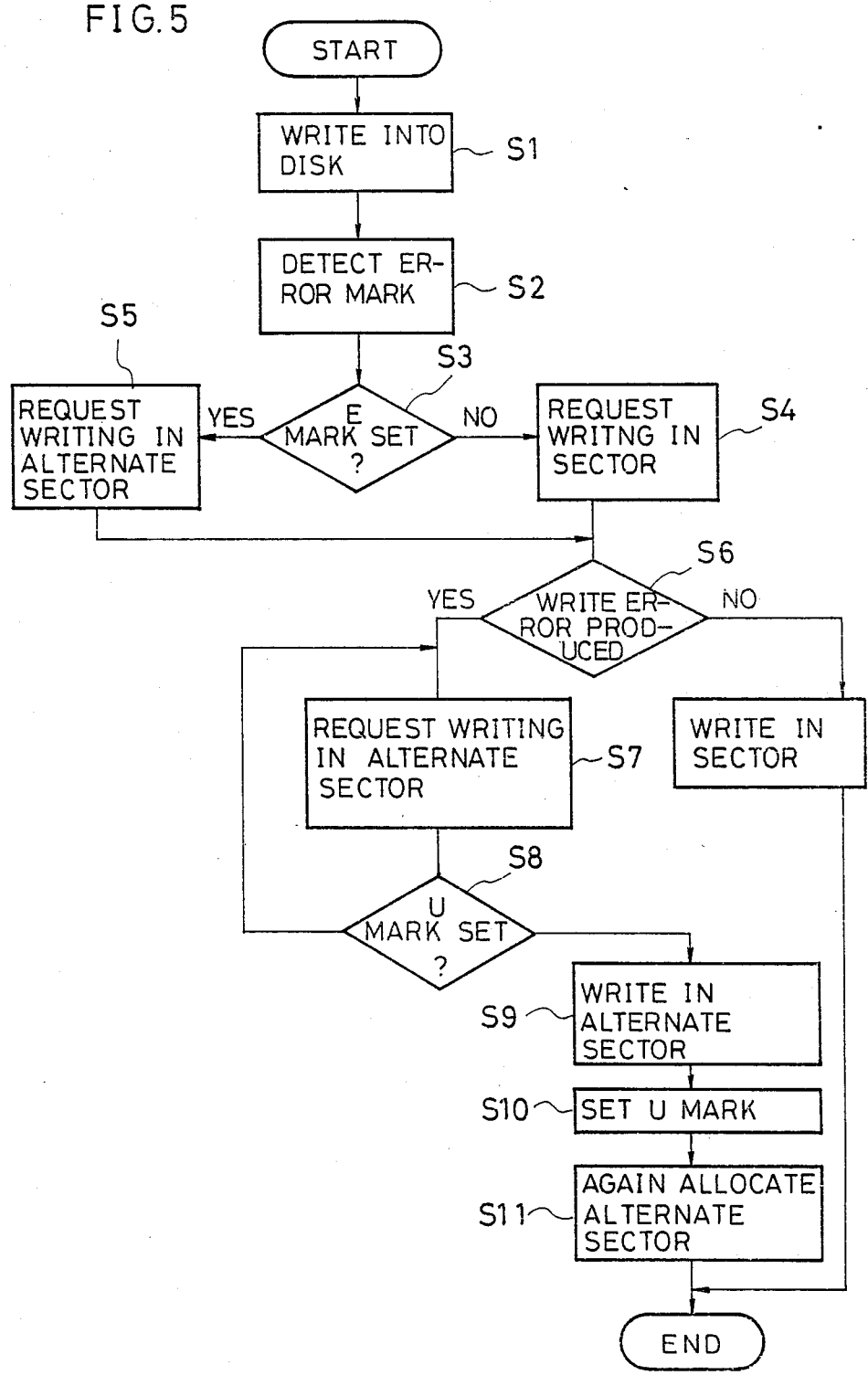
FIG. 5 is a flow chart showing operation of the present invention.
Figure 6:
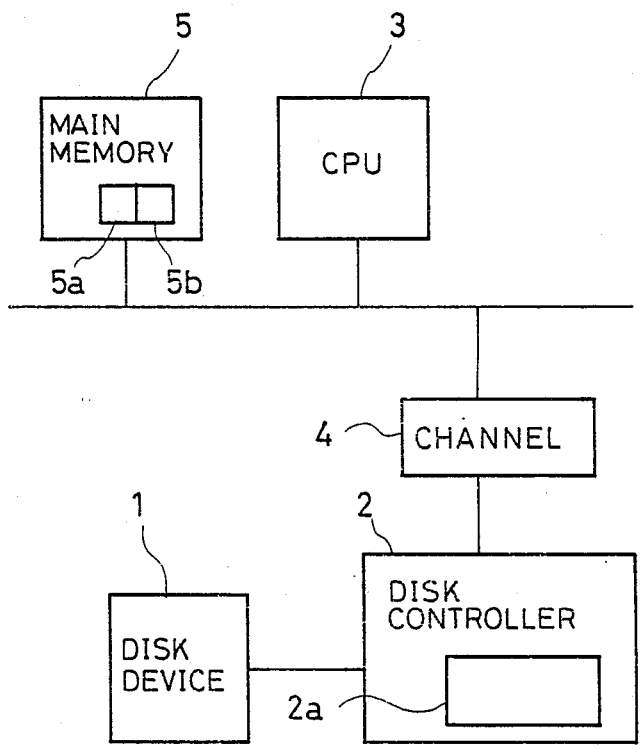
FIG. 6 is a view illustrating the arrangement of a prior write error recovery system.
Figure 7:
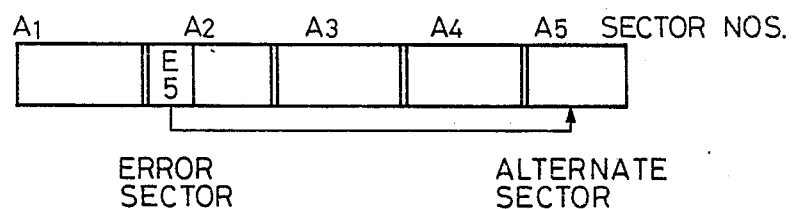
FIGS. 7 and 8 are views respectively illustrating the arrangements of a prior sector part.
Figure 8:
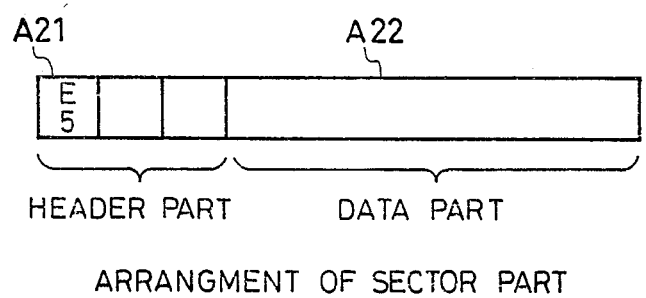
Figure 9:
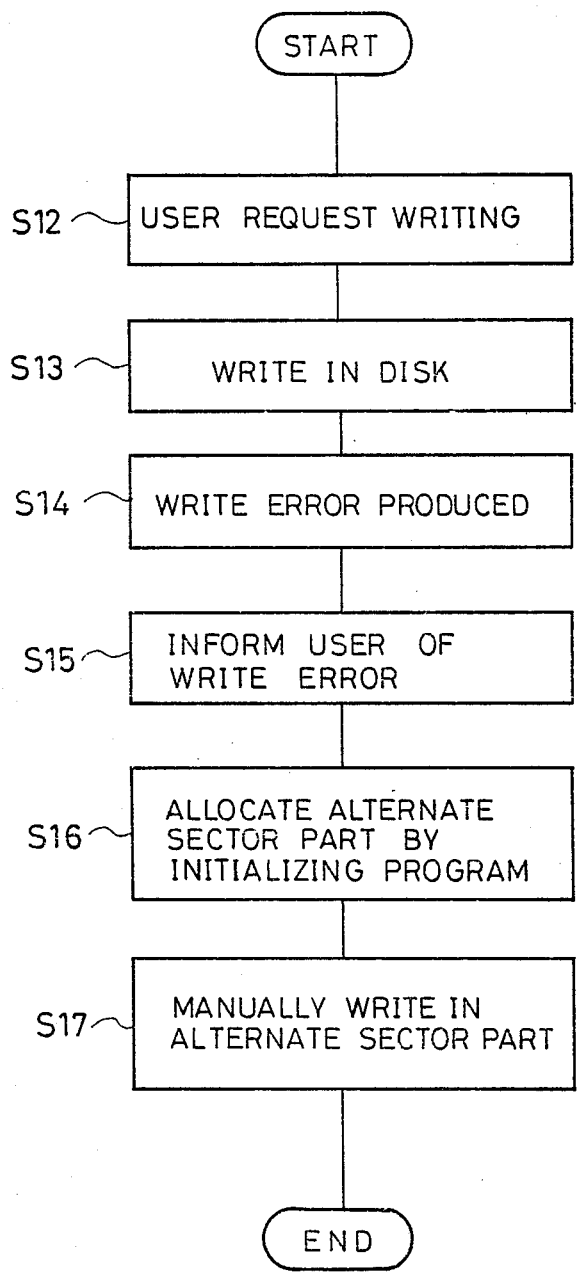
FIG. 9 is a flow chart showing operation of the prior write error recovery system.

In succession, operation of the write error recovery system of the present invention will be described with reference to a flowchart shown in FIG. 5.

First, when there is a write request in the disk from a user, the CPU 3 controls the disk controller 2 on the basis of a driver program 5a stored in the main memory 5, whereby the disk controller 2 starts to write any data in the disk following a disk control program 2a (Step S1).

Thereupon, the write error recovery program 2b accommodated in the disk controller 2 investigates the header part A21 (Step S2) and judges whether or not an error flag E is set (Step S3).

With the error flag E not set, the program 2b writes the associated data in the sector parts A1 to A4 (Step S4).

While, with the error flag E set, the program 2b writes the data in a specified alternate sector part in conformity with information in the header part.

In addition, with any write error produced during such write operation (Step S6), the program 2b writes data in a specified alternate sector part in conformity with information in the header part A21 (Step S7).

When the used mark U is set in the alternate sector part upon such writing of the data in the alternate sector part (Step S8), data is written in another alternate sector part as in the case of the write error during the writing (Step S7).

IF a write error is produced upon writing of the data in the alternate sector, this situation can be made substantially zero by again allocating the alternate sector part after the write error is produced. Once the writing of the associated data in the alternate sector part is completed (Step S9), a used flag U is set to the header part in the alternate sector part (Step S10).

Moreover, the alternate sector part is again assigned in conformity with the disk initialization program 2a (Step S11).

Hereupon, although in this embodiment no consideration is given to performance of the method to specify the alternate sector, provided a final sector in the same cylinder is assumed an alternate sector, processing for the alternate sector is achieved without operation of a disk arm.

In addition, the same effect is assured by providing alternate sectors to the controller as data while employing those data in succession at the detection of any write error to determine the associated alternate sector. This data may be provided by an operating system with ready interruption upon a power source of the disk being turned on. There are many methods to assign data to the alternate sector: data may be read from the disk itself or may be produced by other rules.

Upon surface check of the disk, the alternate sector may be altered corresponding to the associated track. This may improve the performance of the magnetic disk.

According to the disk write error recovery system of the present invention, as described above, an alternate sector part is previously specified for rewriting upon any write error being found, and data is rewritten in the alternate sector part upon the write error being produced while the header part in the alternate sector part is marked with a used mark for recovery of the write error, whereby the device can be made inexpensive, and a user program can appear to have no error. Furthermore, the disk device does not require specific processing upon any error being found and can prepare a disk initialization program in software processing only with the same labor as in prior cases.

What is claimed is:

1. A disk write error recovery system including a disk having a first sector and a second sector, each comprising a header part and a data part, the recovery system functioning such that when any write error is found in writing data in a first data part in said first sector the data is rewritten in a second data part in said second sector instead of writing that data in said first data part, wherein, said second sector is preassigned to said first sector in a first header part in said first sector specifying said second sector for rewriting upon any write error being found in the disk itself, said second sector including a second header part in which said second is marked with a mark indicating that said second sector has already been used for recovering a write error.

2. A disk write error recovery system according to claim 1 wherein said second sector for rewriting is preassigned, further wherein said second sector permits any data written therein to be written in the disk itself and which is rewritten upon any write error being found, based upon the data written in the disk.

3. A method of recovering write errors on the surface of a disk which includes a sector part composed of a header part and a data part, the method comprising the steps of:
    marking the header part of a first sector part with an error flag indicating that a write error has occurred previously in writing to the sector part;
    preassigning in the first sector part an alternate sector to the first sector part;
    determining whether the first sector part has been marked with the error flag; and
    writing the data designated for the first sector part to the preassigned alternate sector part when the first sector part has been marked with the error flag.

4. A method of recovering write errors on the surface of a disk which includes a first sector and other sectors, each composed of a header part and a data part, the method comprising the steps of:
    preassigning in the disk an alternate sector for the first sector by designating said alternate sector with a mark in a first header part in the first sector;
    writing data designated for the first sector in a second data part in said alternate sector upon any write error being found in writing data in said first data part; and
    marking a second header part in said alternate sector when writing the data in said alternate sector with a used flag indicating the particular other sector being used as said alternate sector.

5. The method of claim 4 further including the step of determining if the alternate sector part being accessed for writing is itself defective.

6. The method of claim 4 further including the step of reassigning any header part which has been previously assigned an alternate sector part marked with a used mark to an alternate sector part not marked with a used mark.

* * * * *